US012661878B2

(12) United States Patent
Meistermann et al.

(10) Patent No.: US 12,661,878 B2
(45) Date of Patent: Jun. 23, 2026

(54) THERMOPLASTIC EPOXY MATERIALS WITH CORE SHELL PHASE

(71) Applicant: Zephyros, Inc., Romeo, MI (US)

(72) Inventors: Laurent Meistermann, Ostwald (FR); Melissa Thorelle, Obernai (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 18/402,373

(22) Filed: Jan. 2, 2024

(65) Prior Publication Data

US 2024/0181761 A1  Jun. 6, 2024

Related U.S. Application Data

(63) Continuation of application No. 17/543,528, filed on Dec. 6, 2021, now Pat. No. 11,865,822, which is a continuation of application No. 16/067,435, filed as application No. PCT/US2017/014282 on Jan. 20, 2017, now Pat. No. 11,192,344.

(60) Provisional application No. 62/372,551, filed on Aug. 9, 2016, provisional application No. 62/280,934, filed on Jan. 20, 2016.

(51) Int. Cl.
| | |
|---|---|
| *B32B 27/12* | (2006.01) |
| *B32B 1/00* | (2024.01) |
| *B32B 5/02* | (2006.01) |
| *B32B 5/12* | (2006.01) |
| *B32B 5/26* | (2006.01) |
| *B32B 5/28* | (2006.01) |
| *B32B 7/02* | (2019.01) |
| *B32B 7/04* | (2019.01) |
| *B32B 7/10* | (2006.01) |
| *B32B 15/04* | (2006.01) |
| *B32B 15/092* | (2006.01) |
| *B32B 15/18* | (2006.01) |
| *B32B 15/20* | (2006.01) |
| *B32B 27/16* | (2006.01) |
| *B32B 27/18* | (2006.01) |
| *B32B 27/20* | (2006.01) |
| *B32B 27/28* | (2006.01) |
| *B32B 27/38* | (2006.01) |

(52) U.S. Cl.
CPC ............... *B32B 27/12* (2013.01); *B32B 1/00* (2013.01); *B32B 5/02* (2013.01); *B32B 5/12* (2013.01); *B32B 5/26* (2013.01); *B32B 5/28* (2013.01); *B32B 7/02* (2013.01); *B32B 7/04* (2013.01); *B32B 7/10* (2013.01); *B32B 15/04* (2013.01); *B32B 15/092* (2013.01); *B32B 15/18* (2013.01); *B32B 15/20* (2013.01); *B32B 27/16* (2013.01); *B32B 27/18* (2013.01); *B32B 27/20* (2013.01); *B32B 27/28* (2013.01); *B32B 27/38* (2013.01); *B32B 2250/00* (2013.01); *B32B 2262/00* (2013.01); *B32B 2262/02* (2013.01); *B32B 2262/10* (2013.01); *B32B 2262/106* (2013.01); *B32B 2264/00* (2013.01); *B32B 2264/02* (2013.01); *B32B 2307/542* (2013.01); *B32B 2307/558* (2013.01); *B32B 2307/732* (2013.01)

(58) Field of Classification Search
CPC ........... B32B 27/12; B32B 27/38; B32B 5/02; B32B 5/28; B32B 5/12; B32B 27/28; B32B 27/16; B32B 15/04; B32B 15/092; B32B 1/00; B32B 7/04; B32B 7/10; B32B 27/18; B32B 15/18; B32B 15/20; B32B 5/26; B32B 7/02; B32B 27/20; B32B 2262/106; B32B 2307/542; B32B 2264/00; B32B 2264/02; B32B 2262/00; B32B 2307/558; B32B 2250/00; B32B 2262/10; B32B 2307/732; B32B 2262/02
See application file for complete search history.

(56) References Cited

U.S. PATENT DOCUMENTS

| | | | |
|---|---|---|---|
| 5,198,286 A | 3/1993 | Kagoshima | |
| 6,503,856 B1 | 1/2003 | Broadway | |
| 11,192,344 B2 | 12/2021 | Meistermann | |
| 2010/0122833 A1* | 5/2010 | Han | C08L 23/12 |
| | | | 428/327 |
| 2011/0143619 A1 | 6/2011 | Luinge | |
| 2011/0151232 A1 | 6/2011 | Meegan | |
| 2012/0052435 A1 | 3/2012 | Anazawa | |
| 2013/0072621 A1* | 3/2013 | Abad | C08L 53/00 |
| | | | 977/773 |
| 2013/0161059 A1 | 6/2013 | Steffi | |
| 2015/0118501 A1 | 4/2015 | Lu | |

(Continued)

FOREIGN PATENT DOCUMENTS

| | | | |
|---|---|---|---|
| EP | 0595832 B1 * | 5/1997 | |
| WO | 2005/075189 A2 | 8/2005 | |
| WO | 2008/010823 A2 | 1/2008 | |

(Continued)

OTHER PUBLICATIONS

Machine English translation of WO 2010047287, Matsuzaki et al., Apr. 29, 2010.*

(Continued)

*Primary Examiner* — Patrick D Niland
(74) *Attorney, Agent, or Firm* — The Dobrusin Law Firm, P.C.

(57) ABSTRACT

A composite article (30), comprising at least one fibrous layer (12), and at least one thermoplastic epoxy web layer (14) located in direct planar contact with the at least one fibrous layer (12), the at least one thermoplastic epoxy web layer (14) being adapted to substantially phase separate during a molding and/or curing process.

20 Claims, 3 Drawing Sheets

(56) References Cited

U.S. PATENT DOCUMENTS

2015/0279505 A1      10/2015  Omori
2017/0313918 A1 *   11/2017  Kasahara ............... C08G 59/32

FOREIGN PATENT DOCUMENTS

WO          2008/087467  A1      7/2008
WO      WO-2010047287  A1 *   4/2010    ............... C08F 2/08
WO      WO-2010082482  A1 *   7/2010    ............... C08F 2/24

OTHER PUBLICATIONS

PCT Search Report & Written Opinion dated Apr. 19, 2017, Application No. PCT/US2017/014282.
European Communication dated Jan. 22, 2020, Application No. EP17706912.7.
Second Chinese Office Action dated Oct. 16, 2020, Application No. 201780007195.4.
Second European Communication dated Feb. 8, 2021, Application No. EP17706912.7.

* cited by examiner

THERMOPLASTIC EPOXY MATERIALS WITH CORE SHELL PHASE

TECHNICAL FIELD

The present invention relates generally to thermoplastic epoxy materials, particularly to materials having a thermoplastic epoxy-based matrix and a core-shell phase dispersed in the matrix.

BACKGROUND

There is an ongoing effort in many industries to lighten the weight of articles. In many instances, this is achieved by the selection of materials that have a lower density, thinner section thicknesses, or both, as compared with prior materials or structures. Composite materials are often employed. As a result, there is a potential for the weakening of structures, and the consequent need for stiffening or other structural reinforcement. As new, lightweight materials are employed, there is an additional need for improved adhesives/bonding materials that are compatible with such lightweight materials while providing for sufficient bonding within the composite material layers. As an example, polymeric stitching fibers (e.g., PET fibers) have been utilized to form fibrous composites. However, such fibers are still visible on the composite surface post molding and curing.

There is a further need for the ability to incorporate various additives into adhesive/bonding materials without any deleterious effect on the viscosity of those materials. As one specific example, there may be a desire to incorporate one or more additives that act to toughen the bonding material. A toughening additive is desirable that will enhance impact and damage resistance properties of the composite without adversely affecting other material properties. In the event that the toughening agent is included in a resin during resin infusion in a molding process, the viscosity of the resin will be increased due to the incorporation of the toughening agent. Increased viscosity requires more time to complete the resin infusion and can also cause the fibers within the composite to be moved out of position.

There is also a need for the ability to improve lap shear strength when a thermoplastic epoxy material (e.g., a toughened thermoplastic epoxy material) is employed for bonding to a substrate.

Notwithstanding the above efforts there remains a need for alternative adhesive/bonding layer materials that impart structural rigidity and bond strength. There remains a need for alternative adhesive/bonding layer materials with minimal surface topographical variations on the resulting materials. There is a further need for adhesive/bonding layer materials that can be formed to contain additional additives which may optionally be released upon molding and/or curing of the resulting composite. There is also a need for alternative carrier structures that employ a combination of different materials that, even though they are dissimilar, are still generally compatible (e.g., chemically and/or physically compatible) with each other.

Examples of composite structures are illustrated in PCT Application No. WO 2007/008569, United States Published Patent Application Nos. 2011/0039470 and 2012/0251863, and U.S. Pat. No. 7,581,932 all incorporated by reference for all purposes. See also, U.S. Pat. Nos. 6,855,652, 7,125,461 and 7,318,873, and United States Published Patent Application Nos. 2003/0039792, 2010/0289242, 2011/0278802, and 2009/0202294, incorporated by reference for all purposes.

The present application also is related to and incorporates by reference for all purposes Great Britain Patent Application No. 1318595.4, filed Oct. 21, 2013.

Further to the above, thermoplastic polymers having at least one epoxide group have been described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

The use of such thermoplastic polymers in a composite material has been disclosed in WIPO Patent Application WO/2008/010823 (addressing in situ reaction of an epoxy and an amine after impregnation), incorporated by reference herein. Notwithstanding the above, there remains a need for alternative composite materials. For example, there remains a need for composite materials that are suitable for use in or otherwise with a carrier for a baffle and/or structural reinforcement for a transportation vehicle of a type exemplified in the above discussed patent publications.

SUMMARY OF THE INVENTION

One or more of the above needs are met by the present teachings which contemplate a multi-phase polymeric material, at least one first phase of the material including a thermoplastic epoxy material, and at least one second phase including a core-shell polymeric phase. The at least one first or second phases may be interspersed in the other of the at least one first or second phases (e.g., selectively in a predetermined manner, in a random manner, in a generally uniform manner, a generally non-uniform manner, or any combination thereof). The thermoplastic material may be any thermoplastic epoxy material of a type described in the literature. By way of example, one such class of thermoplastic epoxy materials may be described generally as a reaction product of at least one diepoxide resin and at least one mono primary amine or di-secondary amine. The thermoplastic epoxy material may include a hydroxy-phenoxyether polymer reaction product (e.g., a polyetheramine thermoplastic material) of a mono-functional or di-functional species with an epoxide-containing moiety, such as a diepoxide, reacted under conditions for causing the hydroxyl moieties to react with the epoxy moieties to form a generally linear backbone polymer chain with ether linkages.

The at least one second phase may include a core-shell polymeric phase. In general, such phase may include a plurality of particulates that have an elastomeric core adapted to impart impact resistance to the material, and a shell that is chemically adapted to be compatible with the polymer of the at least one first phase. By way of illustration, useful core-shell graft copolymers may be those where materials such as styrene, acrylonitrile or methyl methacrylate may be grafted onto a core made from polymers of soft or elastomeric compounds such as butadiene or butyl acrylate.

In a general sense, the teachings relate to a toughened thermoplastic epoxy polymeric material, comprising a thermoplastic epoxy matrix first phase; and from greater than 0% by weight up to about 10% by weight, or up to about 20% by weight, of a discrete particulated second phase of a core shell toughening agent dispersed throughout the first phase, and being separable from the first phase.

In one approach to the teachings herein, the thermoplastic epoxy polymeric material may be employed as part of a composite article. The composite article may be transformed during subsequent processing steps to cause separation of the thermoplastic epoxy matrix first phase; and the discrete particulated second phase of the core shell toughening agent. For example, the composite article may comprise at least one fibrous layer and at least one thermoplastic epoxy web layer located in contact with the at least one fabric layer, the at least one thermoplastic epoxy web layer being adapted to substantially dissolve (that is, a skilled artisan would recognize that the at least one thermoplastic epoxy web layer would transform to a fluidic state for affording phase separation as between the two phases) during a molding and/or curing process. The fabric may have a volume and sufficient porosity, in size and amount, to permit the entrance of particulates of the particulated second phase to one or more locations within the volume of the fabric.

The composite article may be substantially free of any liquid or powder adhesive and/or bonding material. The thermoplastic epoxy web layer may melt into an adjacent layer during a molding and/or curing process. The thermoplastic epoxy web layer may comprise an additive that is released into the composite article during a molding and/or curing step. The thermoplastic epoxy web layer may comprise a toughening agent (e.g., a core shell polymer) that is released into the composite article during a molding and/or curing step. An additive may be embedded within the thermoplastic epoxy web layer. The at least one fibrous layer may comprise a carbon fiber material. The thermoplastic epoxy web layer may be formed as a reaction product of diepoxide resin and a mono primary amine or a di-secondary amine. The thermoplastic epoxy web may include a hydroxy-phenoxyether polymer reaction product (e.g., a polyetheramine thermoplastic material) of a mono-functional or di-functional species with an epoxide-containing moiety, such as a diepoxide, reacted under conditions for causing the hydroxyl moieties to react with the epoxy moieties to form a generally linear backbone polymer chain with ether linkages. The composite article may include an epoxy resin injected about the one or more fibrous layers and one or more thermoplastic epoxy webs during a molding process.

The teachings herein further provide for a method of making a thermoplastic epoxy material (e.g., in a suitable form, such as an extrudate, a molded form, a web or a combination of two or more of each) comprising dispersing a particulated toughening agent in a monomeric liquid phase epoxy resin, polymerizing the epoxy resin with monoethanolamine to form a thermoplastic reaction product (which may be a condensation product) having a dispersion (e.g., a substantially homogeneous dispersion) of the particulated toughening agent therein. Optionally, the thermoplastic reaction product having a dispersion of the particulated toughening agent therein may be processed for forming the desired form. For example, it may be subjected to injection molding or other molding to form a thermoplastic epoxy molded form, extrusion to form an extrudate, and/or melt blowing, melt spinning, electrospinning or employing a wet laid process utilizing the reaction product to obtain a thermoplastic epoxy web that includes a thermoplastic epoxy phase and a discrete and separable particulated toughening agent phase.

It is possible that the resulting forms are employed in combination with other forms to define a composite articles. For instance one or more of the resulting forms may be located proximate of a mass of a material in a manner for transferring the particulated toughening agent located therein from the resulting form to the mass of material, such as by a phase separation occasioned by heating the resulting form to one or more temperature thermoplastic epoxy material to become fluidic, while the particulates of the toughening agent remain solid. This can be achieved, for example, by heating to a temperature above the glass transition temperature (or melting point) of the thermoplastic epoxy material but below the glass transition temperature (or melting point) of the toughening agent particulates. The method may further include locating the thermoplastic epoxy web in contact (e.g., in direct contact) with one or more fibrous layers to form a composite article. The method may also include melting the thermoplastic epoxy web within an adjoining mass of epoxy resin so that the dispersed particulate toughening agent remains in place, in contact with the one or more fibrous layers. Then resulting form of the thermoplastic epoxy material may be formed having amine end groups and tertiary amines which react with the epoxy resin to increase cohesion between the one or more fibrous layers.

The teachings herein also provide for a composite comprising at least one first material layer selected from a tape material, a fibrous material, or a polymeric material having an outer surface, and at least one second material layer located in between and in direct planar contact with each of the at least one first material layers, wherein the at least one second material layer is thermoplastic epoxy web comprising a hydroxy-phenoxyether polymer, such as a polyetheramine thermoplastic material, which is a product (e.g., a thermoplastic condensation reaction product) of a reaction of a mono-functional or di-functional species (e.g., monoethanolamine) with an epoxide-containing moiety, such as a diepoxide (e.g., diglycidyl ether bisphenol A) reacted under conditions for causing the hydroxyl moieties to react with the epoxy moieties to form a generally linear backbone polymer chain with ether linkages. The composite may also include exactly one second material layer. The composite may include exactly two first material layers.

The teachings herein are also directed to a prepreg material including a thermoplastic epoxy web present during formation of the prepreg, but integrated into the prepreg material during a curing process. The prepreg material may include a carbon fiber material.

DETAILED DESCRIPTION

Figure 1:
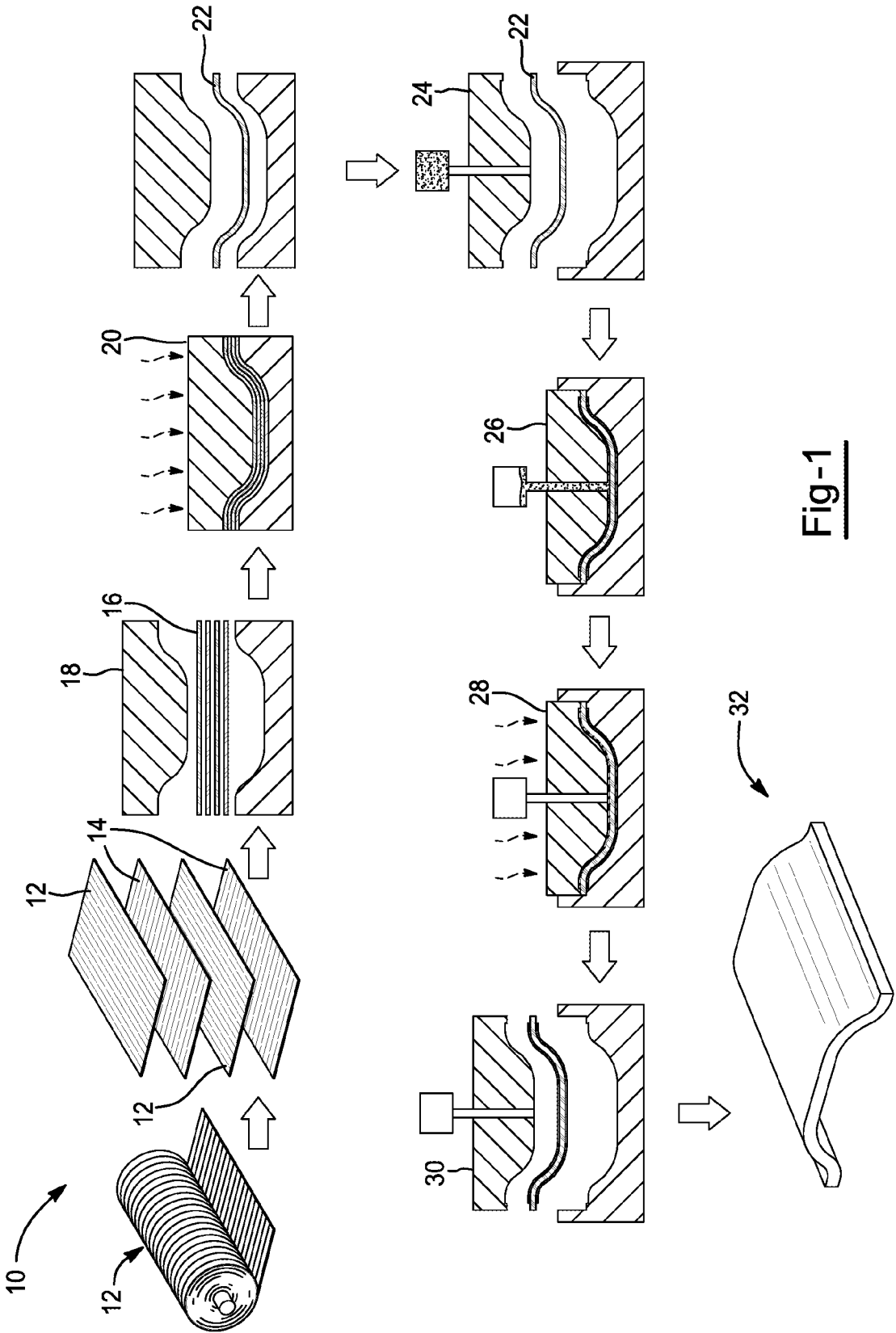
FIG. 1 is a schematic of a system for making an article in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application claims the benefit of the filing dates of U.S. Provisional Application Nos. 62/280,934, filed Jan. 20, 2016; and 62/372,551, filed Aug. 9, 2016, the contents of these applications being hereby incorporated by reference herein for all purposes.

The teachings herein are predicated generally upon the employment in combination of a thermoplastic epoxy material and a core-shell particulated toughening agent.

In one general reaction, the thermoplastic epoxy material may be a reaction product of a diglycidyl ether of a dihydroxy organic compound) and an amino, namely one having two amino hydrogens per molecule (e.g., a reaction product of a diglycidyl ether of bisphenol A and a monoethanolamine), as described for example at col. 1, line 4 through col. 2, line 52 in U.S. Pat. No. 3,317,471 (incorporated by reference). Stated another way, the thermoplastic epoxy polymeric material may be a product (e.g., a thermoplastic condensation reaction product) of a reaction of a monofunctional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

The thermoplastic epoxy material may be any of the thermoplastic epoxy materials described in the literature. Examples include:

(a) a reaction product of diglycidyl ether of a bisphenol with a dihydroxybiphenyl, in which the repeating unit of the polyhydroxyether contains a hydrocarbon connecting group and a hydrocarbon or halogen substituted phenylene radical, as described in U.S. Pat. No. 4,647, 648 (incorporated by reference);

(b) a reaction product of a diglydicyl ether of certain amido-dihydric phenols and N-substituted dihydric phenols, as described in U.S. Pat. No. 5,115,075 (incorporated by reference);

(c) a reaction product of a dihydric phenol (e.g., a diglycidyl ether of one or more of bisphenol ketone, bisphenol sulfone, resorcinol, or hydroquinone) and at least one other dihydric phenol such as 4,4'-ispropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide. 4,4'-dihydroxydiphenyl sulfone, 2,6-dihydroxynaphthalene, 1,4'-dihydroxynaphthalene, catechol, or the like, as described in U.S. Pat. No. 5,164, 472 (incorporated by reference);

(d) a reaction product (e.g., a reactive extrusion product) of a diglycidyl ether of a dihydric phenol with an amine having only two hydrogens under conditions sufficient to form the polyetheramine, as described in U.S. Pat. No. 5,275,853 (incorporated by reference);

(e) a reaction product of dihydric phenol and a diepoxide in the presence of a catalyst selected from bis(trihydrocarbylphosphoranylidene)ammonium salt, bis[tris (dihydrocarbylamino)phosphoranylidene]ammonium salt, or tetrakis[tris(dihydrocarbylamino)phosphoranylideneamino]phosphonium salt, as described in U.S. Pat. No. 5,401,814 (incorporated by reference);

(f) a reaction product prepared by reacting (1) a primary amine or bis(secondary) diamine with (2) a diglycidyl ether and (3) an amine- or epoxy-functionalized poly (alkylene oxide), as described in U.S. Pat. No. 5,464, 924 (incorporated by reference);

(g) a reaction product of a compound having an average of more than one vicinal epoxide group per molecule and a polyhydric phenol or thiophenol, in the presence of a catalytic amount of a tetrahydrocarbyl phosphonium salt in an essentially anhydrous medium, as described in U.S. Pat. No. 4,438,254 (incorporated by reference);

(h) a reaction product of a diepoxide (e.g., diglycidyl ethers of dihydric phenols) and a difunctional species selected from dihydric phenols, dicarboxylic acids, bis-secondary amines, primary amines, dithiols, disulfonamides, and compounds that contain two different functionalities capable of reacting with epoxide groups, as described in U.S. Pat. No. 6,011,111 (incorporated by reference); or (i) a hydroxy-phenoxyether reaction product polymer prepared by reacting a difunctional species (that is, a species having two reactive groups), such as a dihydric phenol, with a diepoxide (that is, a compound having two epoxide functionalities) under conditions sufficient to cause the hydroxyl moieties to react with the epoxy moieties to form ether linkages, as described in WO98/ 14498 (incorporated by reference).

The teachings herein may also be employed with a thermoplastic epoxy material a reaction employed to result in a thermoplastic epoxy polymer that is essentially devoid of nitrogen and/or an amine moiety along its backbone. The reaction product may have a relatively high glass transition temperature, which may be derived from a reaction of at least one diepoxide and at least one bisphenol. The at least one diepoxide (e.g., at least one diglycidyl ether) and at least one bisphenol are reacted (in molar amounts) in a ratio of the at least one diepoxide to the at least one bisphenol in a ratio of about 4:1 to about 1:4 (e.g., about 2:1 to about 1:2, or even about 1:1). In regard to the ingredients of a reaction mixture, the at least one diepoxide may have a molecular weight ranging from about 130 to about 460 g/mol (e.g., about 220 to about 350). The at least one diepoxide may include at least one ether linkage. The at least one diepoxide may include at only two ether linkages. The at least one diepoxide may include at least one, two or more phenyl moieties. For example, it may have only two phenyl moieties. The at least one diepoxide may include at least one ether linkage between at least one phenyl moiety and an epoxide functional group. The diepoxide may be selected from resorcinol diglycidyl ether, diglycidyl ether of bisphenol A ("DGEBA"), bisphenol F diglycidyl ether, bisphenol A propoxylate diglycidyl ether, or any combination thereof. The material of the present teachings may employ as its at least one bisphenol ingredient a bisphenol that has a molecular weight of about 200 to about 360 g/mol. The at least one bisphenol may be selected from 4,4'-(1-phenylethylidene) bisphenol; 4,4'-sulfonylbisphenol; or a combination thereof.

It is contemplated that where fire resistance is desired, some or all of the reactants may employ a brominated reactant. For example, a reactant such as a diglycidyl ether of a bisphenol may be replaced by a brominated bisphenol epoxy resin.

The core-shell particulates referenced herein may include an elastomeric core (e.g., a cross-linked rubber core). The elastomeric core, for example, may include butadiene. The elastomeric core may include a copolymer of butadiene and styrene. The elastomeric core may include a polymer having at least one silicon atom (e.g., a silicone rubber). The core shell particulates may include a shell that includes a (meth) acrylic acid, an ester thereof, and or a nitrile thereof. For example, the particulates may include a copolymer, such as a copolymer of styrene, methyl methacrylate, glycidyl methacrylate and optionally acrylonitrile. The core-shell particulates may be dispersed in a liquid suspension medium in a range of concentrations (e.g., from about 5% to about 50%, such as about 10% to about 40% by weight of the total dispersion). The core-shell particulates may be dispersed in a liquid suspension medium that may include a liquid resin, such as an epoxy based resin (e.g., diglycidyl ether of bisphenol A, diglycidyl ether of bisphenol F, a reaction product of one or both with another ingredient (such as epichlorohydrin), or any combination of these materials). Examples of commercially available core-shell particulates include those sold by Kaneka Corporation under the designation Kaneka Kane Ace, (e.g., grade 136 (dispersed as a concentrate in a diglycidyl ether of bisphenol F; and/or grade 156 (dispersed as a concentrate in a diglycidyl ether of bisphenol A). For additional guidance, the teachings of U.S. 2007/0027233 may be employed. The liquid suspension medium may be such that the particulates require no separation therefrom prior to mixing with other reactants. Thus, it is possible that the liquid suspension medium will form part of the reactants to form the resulting materials of the present teachings.

The core shell particulates may be characterized by one or more of their physical characteristics. For example, the particulates may be generally spherical. They may have an average diameter of about 0.01 micrometers to about 1 micrometers (e.g., about 0.05 to 0.2 micrometers), measured by scanning electron microscopy. Thus, the core-shell particles may be of generally nanoparticle sizes.

The core shell particulates may be employed in an amount relative to the total amount of the core shell particulates and the thermoplastic epoxy material of up to about 20 percent by weight, up to about 15 percent by weight, up to about 10 percent by weight. The core shell particulates may be employed in an amount relative to the total amount of the core shell particulates and the thermoplastic epoxy material of at least about 1 percent by weight, at least about 3 percent by weight, or at least about 5 percent by weight.

The multi-phase materials of the present teachings are made by preparing one or more mixtures of reactants that include the reactants for making the thermoplastic epoxy material and a source of the core-shell particulates. The source of the core-shell particulates, as gleaned from the above, may include a suspension medium that is also introduced into the mixture of reactants. The suspension medium may, for instance, include DGEBA, DGEBF or both. The mixture of reactants may thus include the thermoplastic epoxy material reactants, core-shell particulates, and the suspension medium (e.g., DGEBA, DGEBF or both). The mixture of reactants may then be mixed.

Another possible approach may be to employ an adduct that includes an elastomer. The elastomer adduct imports flexibility and the ability to initiate plastic deformation to the thermoplastic web and any substrate receiving the thermoplastic web. Various epoxy/elastomer adducts may be employed in the present teachings. The elastomer-containing adduct may be a combination of two or more particular adducts and the adducts may be solid adducts, liquid adducts or semisolids at a temperature of 23° C. or may also be combinations thereof. The adduct may be used together with the core/shell impact modifiers described herein, such as methacrylate-butadiene-styrene (MBS), and another modifier, such as polyvinyl butyral (PVB), which may achieve desirable adhesive performance over a wide range of temperatures, even when employing a relatively small amount of the adduct. A lower amount of adduct such as 5% to 15% by weight imparts high temperature stability to the thermoplastic web since there is little undesirable lowering of the glass transition temperature (Tg) of the formulation.

The teachings herein further provide for a multi-phase thermoplastic epoxy material (including core-shell particulates) as described herein. It can take any of a number of different forms, such as a shaped molded article, a sheet, an elongated extrudate with a common shaped profile, a tube, a rod, or the like. One approach envisions a web material, namely a relatively flat constant profile elongated form. The web material may include pores and/or a predetermined arrangement of openings, or other predetermined surface topography. The web material, or other forms more generally, may have a thickness of less than about 10 mm, less than about 7 mm, less than about 5 mm, or less than about 3 mm. It may have a thickness of more than about 0.01 mm, more than about 0.1 mm, or more than about 1 mm.

The multi-phase thermoplastic epoxy material (e.g., the thermoplastic web material layer) is employed in a manner so that is can dissolve into an adjacent layer or other mass of another material, which may occur during a molding step, a curing step, or some other step involving application of heat. The skilled artisan will appreciate from the teachings that reference to dissolution refers to a separation of phases of the multi-phase thermoplastic epoxy material; i.e., a thermoplastic epoxy phase separates from the core-shell particulates, such as by changing to a fluidic state while the core-shell particulates remain in a generally solid state.

By way of one example, an initial multi-phase thermoplastic epoxy material (e.g., the thermoplastic web material layer) may be employed in a manner so that the thermoplastic epoxy matrix becomes fluidic and infiltrates a fibrous mass having a volume. As it infiltrates the fibrous mass, the fluidic material may transport some or all of the core-shell particulates along with it and into a volume of the fibrous mass. Thus, the core-shell particulates may end up located within the fibrous mass volume. The core-shell particulates may end up located within the fibrous mass volume and bonded to one or more fibers of the fibrous mass with the thermoplastic epoxy material from the matrix of the initial multi-phase thermoplastic epoxy material.

It can be seen that the fibrous mass can have its properties enhanced using the materials herein. For example, it is possible that upon dissolution of the initial multi-phase thermoplastic epoxy material (e.g., web layer), the adjacent body (e.g., a fibrous mass such as a layer) receiving the constituents that were originally part of the initial multi-phase thermoplastic epoxy material may be imparted with certain characteristics, including but not limited to, strength, toughness, adhesion, rigidity, or the like. As an additional benefit, it is possible that additive materials may be deposited in the initial multi-phase thermoplastic epoxy material (e.g., web) and those additives become part of the adjacent body (e.g., a fibrous mass such as a layer) upon phase separation of the initial multi-phase thermoplastic epoxy material.

Traditionally, such additives would be added within a resin that is injected about the layers during a molding process. However, addition of some additives to a resin may have unwanted effects on the resin, such as modification of the viscosity of the resin. Thus, by including such additives in the web layer, there is no need to modify the resin, yet the final composite structure has the benefit of the additive upon such phase separation. Example additives may include but are not limited to toughening additives (e.g., core-shell materials, nano particles), curing agents and/or accelerators, fillers, or the like.

As noted, the present teachings relate generally to composite materials. In this regard, there are various composites to which the teachings pertain. The composites share the common characteristic that they each employ a thermoplastic epoxy material layer which is adapted to dissolve (e.g., is adapted to be integrated into an adjacent material layer) during formation of the composite. The thermoplastic epoxy web material has at least one epoxide group. The thermoplastic polymeric material having at least one epoxide group may be a hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

The composite materials may include fibrous material layers adjacent the thermoplastic epoxy web. Though referred to herein as fibrous layers, it is possible that the fibrous layers are not formed of a fibrous material, but are instead formed of any material capable of absorbing the web layer upon dissolution if the web layer. The composite articles may be in a form suitable for use as part for a transportation vehicle. The composite article may be in a form suitable for use as a panel structure. The composite article may be in a form suitable for use as a building construction material, as a furniture material, as a sporting good material or as protective gear material. For fibrous material layers employed herein, the fibers may be employed in the form of a random distribution, a weave, a non-woven mat, a plurality of generally axially aligned fibers (e.g., a tow), a plurality of axially intertwined fibers (e.g., a yarn) or any combination thereof. A plurality of individual fibers may thus be in a generally ordered relationship (e.g., according to a predetermined pattern) relative to each other.

In forming the one or more web layers, the mono-functional or di-functional species referenced herein may include a dihydric phenol, a secondary amine (e.g., a bis-secondary amine), a primary amine, or any combination thereof. Any amine of the functional species can be an aromatic amine, an aliphatic amine or a combination thereof. The mono-functional or di-functional species may have one or two functionalities capable of reacting with epoxide groups to form a generally non-cross-linked polymer. Some particular examples, without limitation, of functional species for reaction with an epoxy moiety in accordance with the present teachings includes an ethanolamine (e.g., mono-ethanolamine), piperazine or a combination thereof. Any of the illustrative functional species may be substituted or unsubstituted.

Other examples of illustrative materials, functional species and diepoxides are described in U.S. Pat. Nos. 5,115, 075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

The process for forming the web after initial polymerization of the thermoplastic epoxy material may be a melt spinning process, and electrospinning process, a melt blowing process, or any process that allows for depositing the web described herein onto a substrate, which substrate may act to absorb the web when it dissolves during a molding and/or curing process. Additives may be included in the web material prior to or after the polymerization step. The formed web may then be applied as a layer on a substrate into which the web material will eventually dissolve (e.g., a fibrous layer).

As shown for example in FIG. 1, the processing system 10 may include one or more fibrous layers 12 that receive one or more web layers 14 therebetween. The alternating layers of fibrous material and web material 16 can be located into a preform tool 18 where heat and pressure 20 are applied. The resulting stabilized preform 22 (e.g., the alternating layers of fibrous and web material post-heat application) can then be located into a mold 24. Once in the mold 24, it is possible that a resin material 26 is injected into the mold 24, over and about the preform 22. A curing step 28 occurs, at which point the web layers 14 dissolve into the adjoining fibrous layers 12. Post-cure, the cured composite 30 can be removed from the mold, forming the desired composite part 32.

Figure 2:
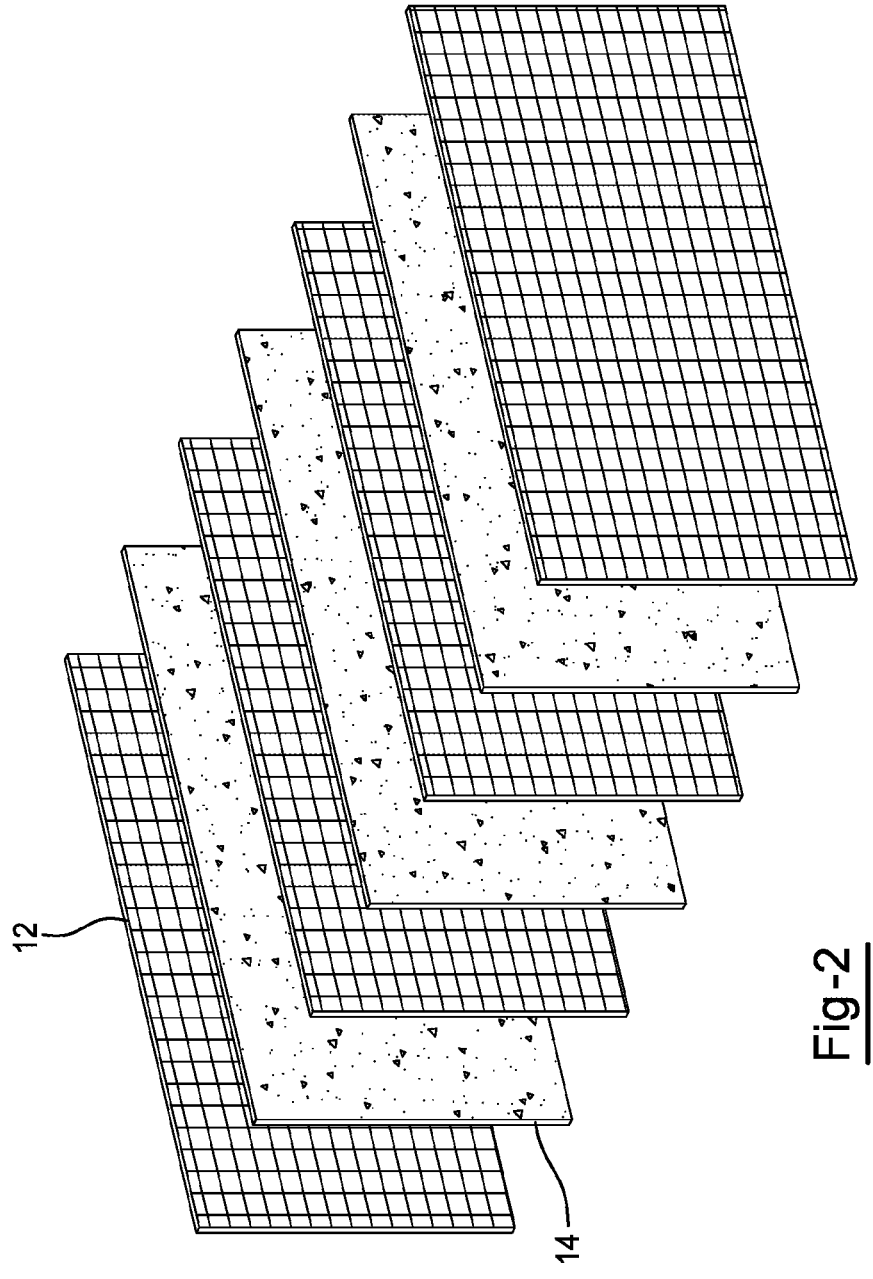
FIG. 2 is an exploded view of an exemplary composite in accordance with the teachings herein.

Example layers for forming the preform are shown in more detail at FIG. 2. More specifically, the fibrous layers 12 are shown in alternating arrangement with the thermoplastic web layers 14. While the layers are shown as alternating, it is possible that multiple fibrous layers may be arranged in direct contact with one another, as may multiple web layers.

Figure 3:
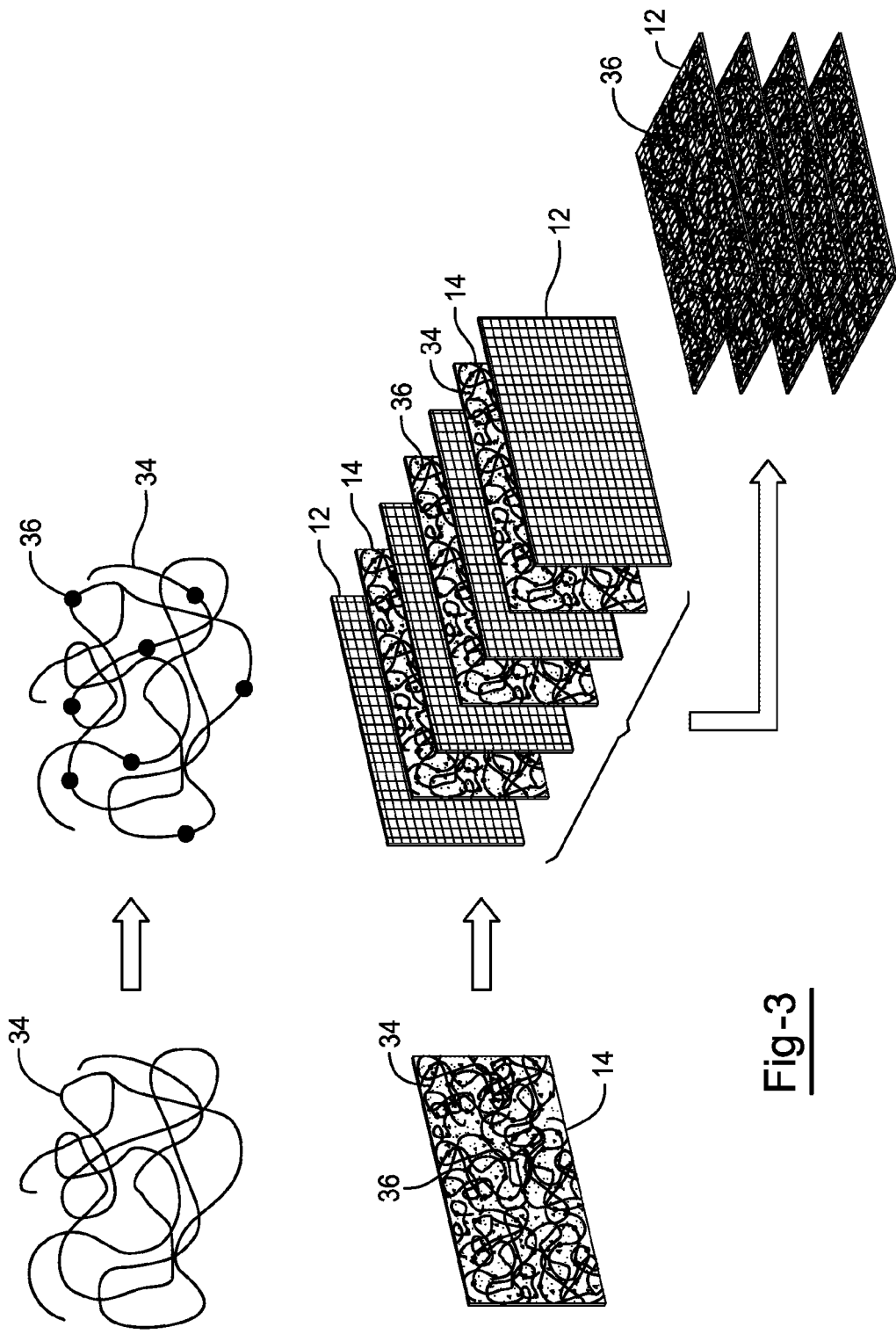
FIG. 3 is a schematic of a system for making an article in accordance with the present teachings.

As shown for example at FIG. 3, it is possible that on the material 34 for forming the web layer 14 may be formed to contain one or more additives 36. The web layers 14 and fibrous layers 12 may be arranged in alternating (or some alternative fashion) to form the preform. Upon dissolution of the web layers 14, the additive 36 becomes part of the fibrous layer 12.

EXAMPLES

The following Examples are illustrative of the teachings and are not intended as limiting. For the examples, viscosity of the resulting mixture in its green state (i.e., prior to cure) or in its post cure state, is measured according to ISO 6721-10:2015, at a temperature of 170° C. at 11 radians/second (rad/s). Glass transition temperature of the post cured material is measured by differential scanning calorimetry (DSC) over a temperature range from 30 to 250° C. at a rate of 10° C./minute (min). Lap shear strength (reported as "shear strength") is measured by ISO 4587:2003, following sandwiching of test compositions between coupons of either degreased galvannealed 1010 steel or 2024 aluminum. Surfaces of the coupons are prepared by degreasing (steel) or sanding (aluminum). Glass ball spacers are used for some samples to maintaining spacing between sheets of metal. For some samples a Teflon® method is indicated, in which a polytetrafluoroethylene spacer is used in lieu of the glass balls as a spacer.

Examples 1 and 2

For Examples 1 and 2, a thermoplastic epoxy material is prepared to include core-shell particulates (Kane Ace MX156 for Example 1, and Kane Ace MX156 for Example 2). The thermoplastic epoxy material includes a reaction product of diglycidyl ether of bisphenol A having an epoxy equivalent weight (g/eq) of about 184-190 (Kukdo YD 128k from Kukdo Chemical) and monoethanolamine. The results are shown in Tables 1 and 2, respectively. Three tests are run for each sample and an average ($\bar{x}$) is reported.

TABLE 1

| Components: Kukdo YD 128k + Mono-Ethanolamine Ratio: 98 | | | Kane Ace MX 156 (DGEBA suspension medium) | | | | | | |
|---|---|---|---|---|---|---|---|---|---|
| | | | 0% | 10% | 15% | 20% | 25% | 35% | 50% |
| Core shell (% by weight) | | | 0.0% | 2.0% | 2.9% | 3.7% | 4.4% | 5.7% | 7.3% |
| Post curing (After min. 5 hours at RT) | | | 150° C.-3 h | 150° C.-3 h | 150° C.-3 h | 150° C.-3 h | 150° C.-3 h | 150° C.-3 h | 150° C.-3 h |
| Viscosity 170° C. @ 11 rad/s (Pa · s) | Essai 1 | | 1210 | 2410 | 515 | 725 | 799 | 3090 | 3630 |
| | Essai 2 | | 1330 | 2390 | 552 | 869 | 1610 | 3060 | 3660 |
| | Essai 3 | | X | X | X | X | 2070 | X | X |
| | $\bar{x}$ | | 1270 | 2400 | 533.5 | 797 | 1493 | 3075 | 3645 |
| DSC (30-250° C., 250° C.-30° C., 30° C.-250° C.: 10°/min) | Tg 1st Heat (° C.) | | 70.4 | 70.9 | 69.4 | 68.8 | 71.1 | 71.6 | 70.4 |
| | Tg 2nd Heat (° C.) | | 77.0 | 77.3 | 75.7 | 76.2 | 76.1 | 77.7 | 78.4 |
| Shear strength (Mpa) @ RT (cure schedule 30 min @170° C.) | Galva G1010 (degrease) + bille de verre | Test 1 | 11.20 | 14.00 | 11.00 | 8.02 | 10.80 | 16.70 | 16.80 |
| | | Test 2 | 11.40 | 11.80 | 8.54 | 8.59 | 17.20 | 14.90 | 20.90 |
| | | Test 3 | 10.20 | 10.90 | 8.99 | 6.96 | 12.30 | 15.90 | 17.40 |
| | | $\bar{x}$ | 10.93 | 12.23 | 9.51 | 7.86 | 13.43 | 15.83 | 18.37 |
| | Alu 2024 (sand paper) + glass beads | Test 1 | 13.50 | 17.60 | 9.27 | 8.78 | 9.00 | 18.80 | 20.20 |
| | | Test 2 | 13.20 | 20.20 | 9.62 | 9.21 | 13.50 | 22.10 | 23.40 |
| | | Test 3 | 14.40 | 13.50 | 11.60 | 8.59 | 15.00 | 18.20 | 21.40 |
| | | $\bar{x}$ | 13.70 | 17.10 | 10.16 | 8.86 | 12.50 | 19.70 | 21.67 |
| | Galva G1010 (degrease) Teflon | Test 1 | 11.20 | | | 13.80 | | 20.00 | 12.10 |
| | | Test 2 | 8.09 | | | 15.00 | | 17.50 | 13.80 |
| | | Test 3 | 10.90 | | | 14.20 | | 16.20 | 12.50 |
| | | $\bar{x}$ | 10.06 | | | 14.33 | | 17.90 | 12.80 |
| | Alu 2024 (sand paper) Teflon | Test 1 | 12.00 | | | 13.30 | | 16.40 | 26.90 |
| | | Test 2 | 12.10 | | | 9.67 | | 17.50 | 24.70 |
| | | Test 3 | 11.90 | | | 9.05 | | 17.40 | 23.40 |
| | | $\bar{x}$ | 12.00 | | | 10.67 | | 17.10 | 25.00 |

TABLE 2

| Components: Kukdo YD 128k + Mono-Ethanolamine Ratio: 98 | | | Kane Ace MX 136 (DGEBF suspension medium) | | | | | | | |
|---|---|---|---|---|---|---|---|---|---|---|
| | | | 0% | 10% | 15% | 20% | 25% | 35% | 50% | 80% |
| Core shell (% by weight) | | | 0.0% | 2.0% | 2.9% | 3.7% | 4.4% | 5.7% | 7.3% | 9.7% |
| Post curing (After min. 5 hours at RT) | | | 150° C.-3 h | 150° C.-3 h | 150° C.-3 h | 150° C.-3 h | 150° C.-3 h | 150° C.-3 h | 150° C.-3 h | 150° C.-3 h |
| Viscosity 170° C. @ 11 rad/s (Pa · s) | Essai 1 | | 1210 | 683 | 1360 | 1500 | 609 | 707 | 1100 | 1280 |
| | Essai 2 | | 1330 | 750 | 1450 | 2130 | 612 | 1040 | 1410 | 1270 |
| | Essai 3 | | X | X | X | X | 1840 | 2390 | X | X |
| | $\bar{x}$ | | 1270 | 716.5 | 1405 | 1815 | 1020.3 | 1379 | 1255 | 1275 |
| DSC (30-250° C., 250° C.-30° C., 30° C.-250° C.: 10°/min) | Tg 1st Heat (° C.) | | 70.4 | 68.3 | 71.2 | 68.3 | 67.0 | 64.9 | 64.8 | 63.3 |
| | Tg 2nd Heat (° C.) | | 77.0 | 74.4 | 74.3 | 73.8 | 73.2 | 72.4 | 71.6 | 70.4 |
| Shear strength (Mpa) @ RT (cure schedule 30 min @170° C.) | Galva G1010 (degrease) + bille de verre | Test 1 | 11.20 | 7.62 | 9.34 | 18.20 | 11.70 | 13.10 | 14.10 | 20.50 |
| | | Test 2 | 11.40 | 8.43 | 11.20 | 12.50 | 9.95 | 13.10 | 12.50 | 19.00 |
| | | Test 3 | 10.20 | 6.69 | 10.80 | 12.40 | 10.60 | 13.10 | 14.70 | 19.80 |
| | | $\bar{x}$ | 10.93 | 7.58 | 10.45 | 14.37 | 10.75 | 13.10 | 13.77 | 19.77 |
| | Alu 2024 (sand paper) + glass beads | Test 1 | 13.50 | 7.56 | 16.60 | 9.10 | 9.58 | 13.50 | 11.50 | 14.90 |
| | | Test 2 | 13.20 | 7.65 | 6.69 | 11.30 | 9.28 | 15.70 | 10.90 | 13.40 |
| | | Test 3 | 14.40 | 8.74 | 13.40 | 13.80 | 13.30 | 11.40 | 10.00 | 14.80 |
| | | $\bar{x}$ | 13.70 | 7.98 | 12.23 | 11.40 | 10.72 | 13.53 | 10.80 | 14.37 |
| | Galva G1010 (degrease) Teflon | Test 1 | 11.20 | | | 10.50 | | 17.70 | 12.40 | 20.80 |
| | | Test 2 | 8.09 | | | 10.70 | | 17.00 | 15.00 | 24.60 |
| | | Test 3 | 10.90 | | | 12.00 | | 17.40 | 14.10 | 26.50 |
| | | $\bar{x}$ | 10.06 | | | 11.07 | | 17.37 | 13.83 | 23.97 |
| | Alu 2024 (sand paper) Teflon | Test 1 | 12.00 | | | 13.50 | | 11.20 | 19.40 | 25.50 |
| | | Test 2 | 12.10 | | | 11.30 | | 11.40 | 10.70 | 25.40 |
| | | Test 3 | 11.90 | | | 10.80 | | 14.00 | 21.50 | 12.60 |
| | | $\bar{x}$ | 12.00 | | | 11.87 | | 12.20 | 17.20 | 21.17 |

Examples 3 and 4

Examples 3 and 4 employ similar testing conditions as in Examples 1 and 2. For Examples 3 and 4, a liquid epoxy resin reaction product of bisphenol A and epichlorohydrin 5 (Epikote 828 from Resolution Performance Products) is employed. The liquid epoxy resin reaction product has an epoxy equivalent weight (g/eq) of about 184-190. Tables 3 and 4 provide results.

Example 5

Example 5 employs similar testing conditions as in Examples 1 through 4. For this example, a liquid epoxy resin as in Examples 1 and 2 is employed. For this Example a different additive is employed. Table 5 provides results. The additive is a colloidal silica dispersed in a diglycidyl ether of bisphenol F liquid suspension medium.

TABLE 3

| Components: EPIKOTE 828LVEL + | | | Kane Ace MX 156 (DGEBA) | | |
| --- | --- | --- | --- | --- | --- |
| Mono Ethanolamine Ratio: 98 | | | 0% | 20% | 35% |
| Core shell (% by weight) | | | 0.0% | 3.6% | 5.7% |
| Post curing (After min. 5 hours at RT) | | | 150° C.-3 h | 150° C.-3 h | 150° C.-3 h |
| Viscosity 170° C. @ 11 rad/s | Test 1 | | 6350 | 23,300 | 5990 |
| (Pa · s) | Test 2 | | 6960 | 21,100 | 7290 |
| | Test 3 | | x | 20,600 | 6550 |
| | $\bar{x}$ | | 6655 | 21667 | 6610 |
| Analyze DSC (30-250° C., | Tg 1st Heat (° C.) | | 74.5 | 75.6 | 73.5 |
| 250° C.-30° C., | Tg 2nd Heat (° C.) | | 79.6 | 82.3 | 79.2 |
| 30° C.-250° C.: 10°/min) | | | | | |
| Shear strength (Mpa) @ RT | Galva G1010 | Test 1 | 14.00 | 26.10 | 19.20 |
| (cure schedule 30 min | (degrease) | Test 2 | 16.20 | 36.3 | 27.30 |
| @170° C.) | scotch | Test 3 | 14.60 | 26.20 | 29.30 |
| | | $\bar{x}$ | 14.93 | 29.53 | 25.27 |
| | Alu 2024 | Test 1 | 18.10 | 26.80 | 29.50 |
| | (sand paper) | Test 2 | 16.30 | 26.70 | 28.90 |
| | scotch | Test 3 | 18.20 | 24.50 | 31.70 |
| | | $\bar{x}$ | 17.53 | 26.00 | 30.03 |

TABLE 4

| Components: EPIKOTE 828LVEL + | | | Kane Ace MX 136 (DGEBF) | | | |
| --- | --- | --- | --- | --- | --- | --- |
| Mono Ethanolamine Ratio: 98 | | | 0% | 10% | 20% | 35% |
| Core shell (% by weight) | | | 0.0% | 2.0% | 3.6% | 5.7% |
| Post curing (After min. 5 hours at RT) | | | 150° C.-3 h | 150° C.-3 h | 150° C.-3 h | 150° C.-3 h |
| Viscosity | | Test 1 | 6350 | 7630 | 7290 | 6030 |
| 170° C. @ | | Test 2 | 6960 | 7820 | 6820 | 5980 |
| 11 rad/s (Pa · s) | | Test 3 | x | x | x | x |
| | | $\bar{x}$ | 6655 | 7725 | 7055 | 6005 |
| Analyze DSC (30-250° C., | Tg 1st Heat (° C.) | | 74.5 | 74.6 | 72.0 | 72.2 |
| 250° C.-30° C., | Tg 2nd Heat (° C.) | | 79.6 | 78.4 | 76.8 | 75.6 |
| 30° C.-250° C.: 10°/min) | | | | | | |
| Shear strength | Galva | Test 1 | 14.00 | 20.80 | 25.30 | 27.40 |
| (Mpa) @ RT | G1010 | Test 2 | 16.20 | 24.60 | 25.20 | 28.20 |
| (cure schedule | (degrease) | Test 3 | 14.60 | 26.50 | 24.20 | 27.30 |
| 30 min @170° C.) | scotch | $\bar{x}$ | 14.93 | 23.97 | 24.90 | 27.63 |
| | Alu 2024 | Test 1 | 18.10 | 27.80 | 28.70 | 19.70 |
| | (sand paper) | Test 2 | 16.30 | 24.10 | 29.20 | 19.60 |
| | scotch | Test 3 | 18.20 | 24.10 | 28.60 | 21.80 |
| | | $\bar{x}$ | 17.53 | 25.33 | 28.83 | 20.37 |

TABLE 5

| Components: Kukdo YD 128k + | | | Nanopox A 510 (DGEBF) | | |
|---|---|---|---|---|---|
| Mono Ethanolamine Ratio: 98 | | | 0% | 10% | 20% |
| Core shell (% en masse) | | | 0.0% | 3.2% | 5.9% |
| Post curing (After min. 5 hours at RT) | | | 150° C.-3 h | 150° C.-3 h | 150° C.-3 h |
| Viscosity 170° C. @ 11 rad/s (Pa · s) | Test 1 | | 1210 | 445 | 265 |
| | Test 2 | | 1330 | 484 | 268 |
| | Test 3 | | X | 385 | 388 |
| | x̄ | | 1270 | 438 | 307 |
| Analyze by DSC (30-250° C., 250° C.-30° C., 30° C.-250° C.: 10°/min) | Tg 1st Heat (° C.) | | 70.4 | 67.2 | X |
| | Tg 2nd Heat (° C.) | | 77.0 | 73.2 | X |
| Shear strength (Mpa) @ RT (cure schedule 30 min @170° C.) | Galva G1010 (degrease) scotch | Test 1 | 11.20 | 6.03 | 5.94 |
| | | Test 2 | 8.09 | 6.07 | 6.07 |
| | | Test 3 | 10.90 | X | X |
| | | x̄ | 10.06 | 6.05 | 6.01 |
| | Alu 2024 (sand paper) scotch | Test 1 | 12.00 | 5.31 | 5.25 |
| | | Test 2 | 12.10 | 5.31 | 6.82 |
| | | Test 3 | 11.90 | 7.77 | 5.66 |
| | | x̄ | 12.00 | 6.13 | 5.91 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Use of (meth)acrylic or (meth)acrylate encompasses respectively an acrylic or methacrylic, or an acrylate or methacrylate.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A composite article, comprising:

i) at least one fibrous layer; and ii) a matrix material in direct contact with the at least one fibrous layer, the matrix material comprising a monoethanolamine and a diepoxide, wherein the monoethanolamine and diepoxide react to form a thermoplastic condensation reaction product during processing;

wherein the matrix material includes hydroxyl moieties and epoxy moieties which react to form a generally linear backbone polymer chain with ether linkages;

wherein the matrix material contains an additive;

wherein the additive is a toughening agent comprising a core shell material present in an amount of at least 5.7% by weight of the matrix material;

wherein as a result of the amount of core shell material, the matrix material in its green state has a viscosity as measured according to ISO 6721-10:2015, at a temperature of 170° C. at 11 radians/second (rad/s) of at least 3060 Pa·s and a shear strength as measured by ISO 4587:2003 of at least 14.9 Mpa;

wherein during a molding process, at least a portion of the matrix material liquifies, and the liquified matrix material and the additive impregnate the at least one fibrous layer; and wherein the liquified matrix material solidifies resulting in the reaction product.

2. The composite article of claim 1, wherein the diepoxide comprises a bisphenol A liquid epoxy.

3. The composite article of claim 1, wherein the composite article is substantially free of any liquid or powder adhesive and/or bonding material.

4. The composite article of claim 2, wherein the reaction product is formed during a molding and/or curing process.

5. The composite article of claim 1, wherein the additive is embedded within the matrix material.

6. The composite article of claim 1, wherein the at least one fibrous layer comprises a carbon fiber material.

7. The composite article of claim 1, wherein the shear strength, is up to about 31.7 MPa, and wherein the viscosity is up to 7290 Pa·s.

8. The composite article of claim 7, wherein the composite article has less than about twenty percent by volume of aggregates of particles of the additive.

9. The composite article of claim 1, wherein the toughening agent is a core shell toughening agent.

10. The composite article of claim 9, wherein the core shell toughening agent includes particulates having an elastomeric core and a shell including at least one meth (acrylic) acid, ester thereof, and/or nitrile thereof.

11. The composite article of claim 8, wherein the diepoxide is bisphenol F.

12. The composite article of claim 9, wherein the toughening agent is characterized by particles that are nanoparticles.

13. The composite article of claim 12, wherein the toughening agent has a glass transition temperature ($T_g$) of between about 65° C. and about 125° C.

14. The composite article of claim 1, wherein the composite article forms a protective gear.

15. The composite article of claim 1, wherein the composite article is processed by molding, and the reaction product forms during the molding.

16. The composite article of claim 2, wherein the at least one fibrous layer is employed in the form of a random distribution, a weave, a non-woven mat, a plurality of generally axially aligned fibers, a plurality of axially intertwined fibers, or any combination thereof.

17. The composite article of claim 1, wherein the composite article includes at least two fibrous layers.

18. The composite article of claim 1, wherein the composite article has a glass transition temperature of between about 65° C. and about 72° C.

19. The composite article of claim 1, wherein the composite article includes an epoxy resin injected about the reaction product during a curing process.

20. The composite article of claim 1, wherein the matrix material comprises a polyhydroxy amino ether.

* * * * *